United States Patent
Gschwind et al.

(10) Patent No.: US 9,146,715 B1
(45) Date of Patent: Sep. 29, 2015

(54) SUPPRESSION OF TABLE OF CONTENTS SAVE ACTIONS

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/478,589

(22) Filed: Sep. 5, 2014

(51) Int. Cl.
*G06F 9/44* (2006.01)
*G06F 9/45* (2006.01)
*G06F 9/445* (2006.01)

(52) U.S. Cl.
CPC *G06F 8/41* (2013.01); *G06F 8/443* (2013.01); *G06F 8/54* (2013.01)

(58) Field of Classification Search
None
See application file for complete search history.

(56) References Cited

U.S. PATENT DOCUMENTS

| | | | | |
|---|---|---|---|---|
| 5,797,014 | A * | 8/1998 | Gheith | 717/163 |
| 5,845,118 | A * | 12/1998 | Gheith | 717/158 |
| 6,625,807 | B1 | 9/2003 | Chen | |
| 6,966,055 | B2 | 11/2005 | Haber et al. | |
| 9,021,512 | B1 * | 4/2015 | Gschwind | 719/331 |
| 2011/0167415 | A1 | 7/2011 | Hayashida | |
| 2011/0289303 | A1 * | 11/2011 | Silvera et al. | 712/228 |
| 2013/0031535 | A1 * | 1/2013 | Ji et al. | 717/145 |
| 2013/0086570 | A1 * | 4/2013 | Blainey et al. | 717/165 |
| 2013/0263153 | A1 * | 10/2013 | Gschwind | 719/313 |

OTHER PUBLICATIONS

Gschwind et al., "Supression of Table of Contents Save Actions," U.S. Appl. No. 14/511,831, filed Oct. 10, 2014.
Gschwind, M. et al, "Usage of TOC Register as Application Register," U.S. Appl. No. 14/206,463, filed Mar. 12, 2014.

* cited by examiner

*Primary Examiner* — Isaac T Tecklu
(74) *Attorney, Agent, or Firm* — Penny L. Lowry; Steven L. Bennett

(57) ABSTRACT

A compiler identifies a first function call site in a calling function that requires an unconditional Table of Contents (TOC) save of the TOC pointer value. The compiler identifies a first location for the unconditional TOC save that dominates the first function call site. The compiler also identifies a second function call site in the calling function that requires a conditional or unconditional TOC save, and determines that the first location also dominates the second function call site. The compiler emits a TOC save instruction at the first location that satisfies both the unconditional TOC save requirement for the first function call site and the conditional or unconditional TOC save requirement for the second function call site. The compiler then indicates that the emitted TOC save instruction satisfies the TOC save requirement for the second function call site, thus suppressing further TOC save actions for the second function call site.

11 Claims, 9 Drawing Sheets

SUPPRESSION OF TABLE OF CONTENTS SAVE ACTIONS

BACKGROUND

The present invention relates generally to computer systems, and more specifically, to suppressing table of contents (TOC) placeholders in function calls for save commands of a TOC pointer value and to suppressing other TOC save actions when a TOC save command for a function call already exists.

In computer software, an application binary interface (ABI) describes the low-level interface between an application program and the operating system or between the application program and another application. The ABI covers details such as data type, size, and alignment; the calling conventions which control how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allows a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

The compiler works on a single source file (compile unit) at a time to generate object files. The compiler generates object code without knowing the final address or displacement of the code/data. Specifically, the compiler generates object code that will access a TOC for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module, i.e., a grouping of object code and data, in a computer program may have a different TOC pointer value. In some instances, a module may correspond to multiple TOCs where groups of at least one function may share a TOC different from other groups. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Embodiments include a computer implemented method, a system, and a computer program product for processing table of contents (TOC) saves. A compiler identifies a first function call site in a calling function. The first function call site requires an unconditional TOC save of the TOC pointer value stored in the TOC register for the calling function. The first function call site may require an unconditional TOC save, for example, if the first function call is an indirect function call. The compiler identifies a location in the calling function that dominates the first function call site. This identified location is for the unconditional TOC save.

The compiler also identifies a second function call site in the calling function. The second function call site requires either a conditional or an unconditional TOC save of the TOC pointer value. The compiler determines that the identified location for the unconditional TOC save for the first function call site also dominates the second function call site. The compiler emits a TOC save instruction at the identified location. This emitted TOC save instruction satisfies both the unconditional TOC save requirement for the first function call site and the conditional or unconditional TOC save requirement for the second function call site, thus eliminating any need for a second TOC save for the second function call site.

The compiler indicates that the emitted TOC save instruction satisfies the conditional or unconditional TOC save requirement for the second function call site, thus suppressing any further TOC save actions related to the second function call site. In various embodiments, the compiler may indicate that the emitted TOC save instruction satisfies the TOC save requirement for the second function call site, for example, by indicating that the second function call site does not require a TOC save, by indicating that the second function call site does not require a TOC save placeholder, by ending a TOC save placeholder insertion algorithm for the second function call site, or by inserting, at the second function call site, a function call instruction with a relocation indicator pointing to the emitted TOC save instruction.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
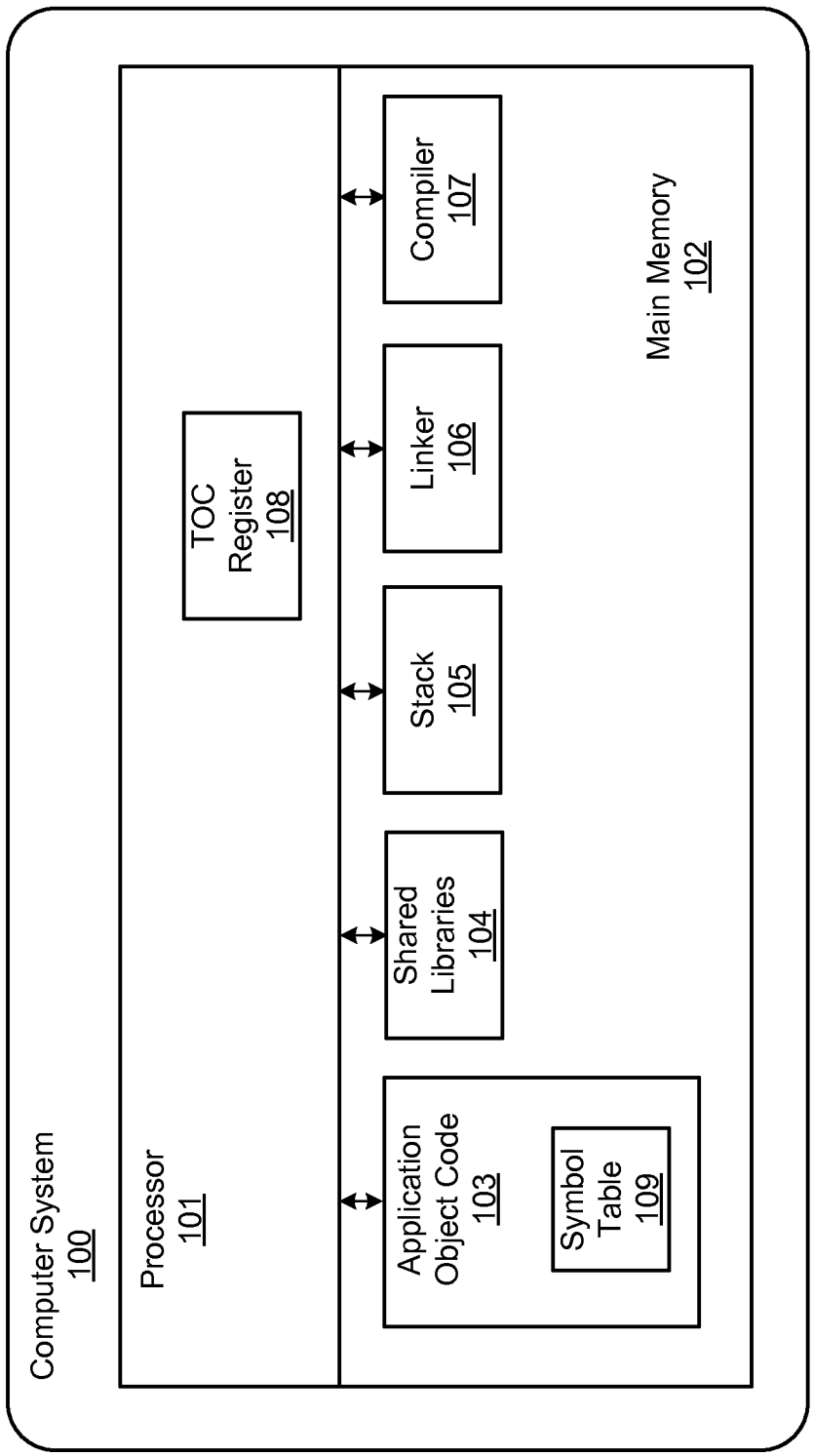
FIG. 1 depicts a computer system for use in conjunction with suppressing placeholders of save commands for a table of contents (TOC) pointer value and with suppressing other TOC save actions when a TOC save command already exists in application object code, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, more particular aspects relate to suppressing placeholders of save commands for a table of contents (TOC) pointer value and to suppressing other TOC save actions when a TOC save command already exists in the application object code for saving the TOC pointer value of the calling function. In various embodiments, a first function call site within object code may require a TOC save of a TOC pointer value that is stored in a TOC register for a calling function before the callee function is called. An example of a function call requiring a TOC save command is a function pointer call, which may also be referred to as an indirect function call. The TOC save command may exist in the application source code before being compiled or may be inserted by a compiler when the compiler determines an unconditional TOC save is required. The compiler may identify other function calls that may require a possible save of the same TOC pointer. The compiler may provide a relocation indicator with the other functions calls that a TOC save command already exists for storing the TOC pointer value. The relocation indicator specifies to a static linker that a TOC save command need not to be inserted at the TOC placeholders of the other function calls when performing the linking Thus, when the application object code is executed, the save of the TOC pointer value of the TOC register to a TOC stack frame may occur when the first function is called. The save of the TOC pointer may not need to be repeated for other function calls that require a save of the same TOC pointer unless there is a command that invalidates the TOC save. This reduces the use of processor resources when executing the code by removing redundant saves of the TOC pointer value that is already saved.

Embodiments describe a method of suppressing TOC placeholders of save commands for a TOC pointer value and of suppressing other TOC save actions when a TOC save command already exists for saving the same TOC pointer value. A TOC pointer value that is in a TOC register for a calling function may require a save and restore when the calling function calls a local or external function. Some function calls may not require a TOC pointer value save. For example, for a function call from a calling function to a callee function that is in the same module as the calling function (i.e., a local function call), the TOC pointer value is the same for the calling and the callee function, and the TOC pointer value in the TOC register does not need to be saved and restored in conjunction with the local function call, but is rather left in the TOC register for use by the callee function. Where multiple different TOCs exist in a single module, each collection of functions with a separate TOC may be treated as a separate module, and only calls sharing a TOC are treated as local calls, whereas calls to functions in the same module but having a different TOC are treated as external calls.

However, for some local functions that may be called during execution of application object code, the TOC pointer is not necessary. For example, a callee function may not use any global data, or may use an addressing mode such as program counter (PC)-relative addressing, which makes the TOC pointer unnecessary for the callee function. Additionally, a function may make use of absolute addressing, i.e., accessing the data in a GOT and/or a TOC using absolute addresses, i.e., addresses having numeric values that can be directly derived by decoding the instruction stream (i.e., addresses stored in one or more instructions as a direct field). Based on a determination that TOC pointer is not required by the callee function, or based on an indicator in the source code to generate code without the use of a TOC register, the compiler further generates a symbol table entry having an indication that the function does not need a TOC pointer, but rather may use the TOC register as an application register. When using the TOC register as an application register, the TOC pointer value within the TOC register may require saving before calling the local function and require restoration in the TOC register value when the function has completed.

The symbol table is generated by a compiler at the time of generating the application object code from corresponding program source code. The symbol table includes a data structure that associates each identifier (e.g., function and variable names) in a program's source code with information relating to its declaration or appearance in the source code, such as type, scope level, and/or location. A TOC register usage indicator may be associated in the symbol table with any function in the application source code that does not require a TOC pointer. In various instances, the TOC register usage indicator(s) may be stored in a "st_other" field in the symbol table for each function listed in the symbol table. For example, a TOC register usage indicator may be a 1 bit field, having a first value that indicates that the function needs a TOC pointer (for example, 1) and a second value that indicates that the function does not need a TOC pointer (for example, 0). The TOC register usage indicator may have any appropriate number of bits, and may have definitions corresponding to a plurality of values that give different manners of handling the TOC pointer and TOC register.

A static linker may recognize a function in application object code that does not need a TOC pointer value based on an indication comprising a symbol table entry for the function that is stored in a symbol table of the application object code.

In other instances, the indication may be stored in and associated with the function of any other appropriate location. For such identified local functions, the static linker inserts a TOC save command and a TOC restore command into the application object code in conjunction with any calls to the local function.

For calls to functions that do not require a TOC pointer that are called by another module as external (or global) functions, the symbol table may indicate the TOC register is used for something else. The external function may not require a TOC pointer in various situations but in other instances the external function may require a TOC pointer. Since it is an external function, the TOC pointer value of the external callee function may be different than the TOC pointer value of the calling function. In any instance, the TOC pointer value in the TOC register for the calling function may need TOC save and restore commands to save the calling function's TOC pointer value while the TOC register is being used for the external function's TOC pointer value. When calling to an external function the TOC save command may be inserted into PLT stub code.

At static linking time, which is after compilation but before runtime of application source code, the static linker identifies any functions that are local. For those functions, the static linker identifies the subset that has a TOC register usage indicator that specifies either the callee function does not need a TOC pointer and uses the TOC register that is normally holding the TOC pointer (e.g., register R2) as an application register, or specifies external functions that may load an alternative TOC pointer value into the TOC register for the external callee function. The static linker then inserts TOC save and restore commands before and after each call to any such function. The TOC save and restore commands may comprise PLT code segments. In various embodiments of the present disclosure, the TOC save and restore commands may comprise PLT code segments when a TOC placeholder is not present. The TOC save command may save the TOC pointer value in the TOC register (i.e., the TOC pointer value for the calling function) to a TOC save area in a stack frame corresponding to the calling function in the execution stack of the application source code before starting execution of the callee function. The TOC restore command restores the value in the TOC save area in the stack frame corresponding to the calling function (i.e., the TOC pointer value for the calling function) back to the TOC register after completion of execution of the callee function.

When the static linker inserts TOC pointer value save and restore commands before and after each call to a callee function that requires the TOC pointer value of the calling function to be saved, the linker is inserting the commands into TOC placeholders instruction for TOC save commands and TOC restore commands that are created by the compiler before or after the various function calls. The compiler may insert these TOC placeholders instructions for calling functions that may not need a TOC pointer value save or restore because it is unknowable until execution time whether the callee function is a local or an external callee and whether or not a save and restore of a TOC pointer needs to occur. In the instances when a TOC save and a TOC restore are needed for a calling function, the callee function may reside within a loop and the TOC pointer value is repeatedly stored in the TOC save area in the TOC stack and restored to the TOC register for each iteration of the loop since the TOC save command immediately precedes the function call. Also, in certain instances, the TOC save location in conjunction with the corresponding TOC restore location, either in a callee function's epilogue, or after a callee function invocation in the caller, may lead to load-hit-store (LHS) interlocks and/or rejects. The LHS interlocks may be prevalent in short callee functions where there are not many commands between the TOC save command and the TOC restore command.

In various embodiments, a function call may have a TOC save command associated with it during compilation of the application source code or because the compiler recognizes that the callee function is a function that requires an unconditional save and inserts a TOC save command before the function call. The compiler will continue to determine placeholder location for TOC commands, e.g., TOC save command, associated with function calls that may be populated with TOC commands by the linker. These TOC save commands may save the identical TOC pointer value that is to be saved by the existing TOC save command. Because of these repeated save commands that are inserted by the linker and LHS interlocks, system performance may be decreased because processor resource usage may be greater due to repeated TOC pointer value saves or slowed to prevent LHS interlocks. Various embodiments herein include a compiler configured to position TOC placeholders for TOC save and restore commands and to make the location of the TOC placeholders more optimal. Also, the compiler may be configured to recognize an existing TOC save within the application object code and provide relocation indicators to function call sites that associate the function call site with the existing TOC save command. Existing TOC save commands may be indicated to the linker so as to refrain from inserting TOC save commands into the TOC placeholder instructions of the function calls. Furthermore, existing TOC save command due to an unconditional save that are known to the compiler may be positioned to preceding TOC placeholder locations for potential TOC save commands and further optimized like the TOC placeholder locations.

FIG. 1 illustrates an embodiment of a computer system 100 configured to generate and suppress placeholders of save commands for a TOC pointer value and other TOC save actions when a TOC save command already exists for saving the same TOC pointer value. Computer system 100 may include a processor 101 and a main memory 102. Application object code 103, which is generated from program source code (not shown) by a compiler such as compiler 107, may include a plurality of functions, and may be stored in main memory 102 for execution by processor 101. The application object code 103 may be generated by a compiler that is located on a different computer system from computer system 100. Application object code 103 may include a symbol table 109, which may be generated by the compiler 107 when the application object code 103 is generated. The symbol table 109 may include a data structure that associates each identifier (i.e., function and variable names) in a program's source code with information relating to its declaration or appearance in the source code, such as type, scope level, and/or location.

In various embodiments, the computer system 100 may include other components. Shared libraries 104 may include functions that are external to application object code 103 and may be called during execution of application object code 103 via external function calls. Stack 105 may include a data structure that stores information, including a TOC pointer, related to active functions during the execution of application object code 103. Each active function in application object code 103 has a respective stack frame in stack 105 during execution. Static linker 106 may include a component that inserts TOC save and restore commands in application object code 103 based on the TOC register usage indicator(s) corresponding to symbols in symbol table 109 before runtime of the application object code 103 and for calls to external/global functions. TOC register 108 may be a hardware register located in processor 101. TOC register 108 may store a value of a TOC pointer for the currently active function of application object code 103 (i.e., the function that is currently executing) when a TOC pointer is used by a function. The TOC register 108 may be register R2 for instance in Power® ABI. Although, in other computer architectures, other registers may be used or numbered differently.

In further embodiments of a computer system such as computer system 100, the TOC register 108 may store a global offset table (GOT) pointer value instead of a TOC pointer value, and GOT save and restore points may be managed in application object code 103 by static linker 106 when a GOT is used by the function. When referring to TOC herein, GOT may be considered as a substitute for TOC and TOC may be used to indicate both TOC and GOT or any other table used to store pointers or addresses code uses to locate data. In yet other embodiments, the TOC register 108 may store a pointer providing access to another data dictionary structure, i.e., a structure designed to provide access to data not stored on a stack frame. In various embodiments, a function in application object code 103 may use the TOC register 108 as an application register when the TOC register 108 is not using a TOC pointer or GOT value. Some callee local functions may not require a TOC pointer value in which case the TOC register may be used as an application register and a save and restore of the calling function's TOC pointer may need to be performed.

Figure 2:
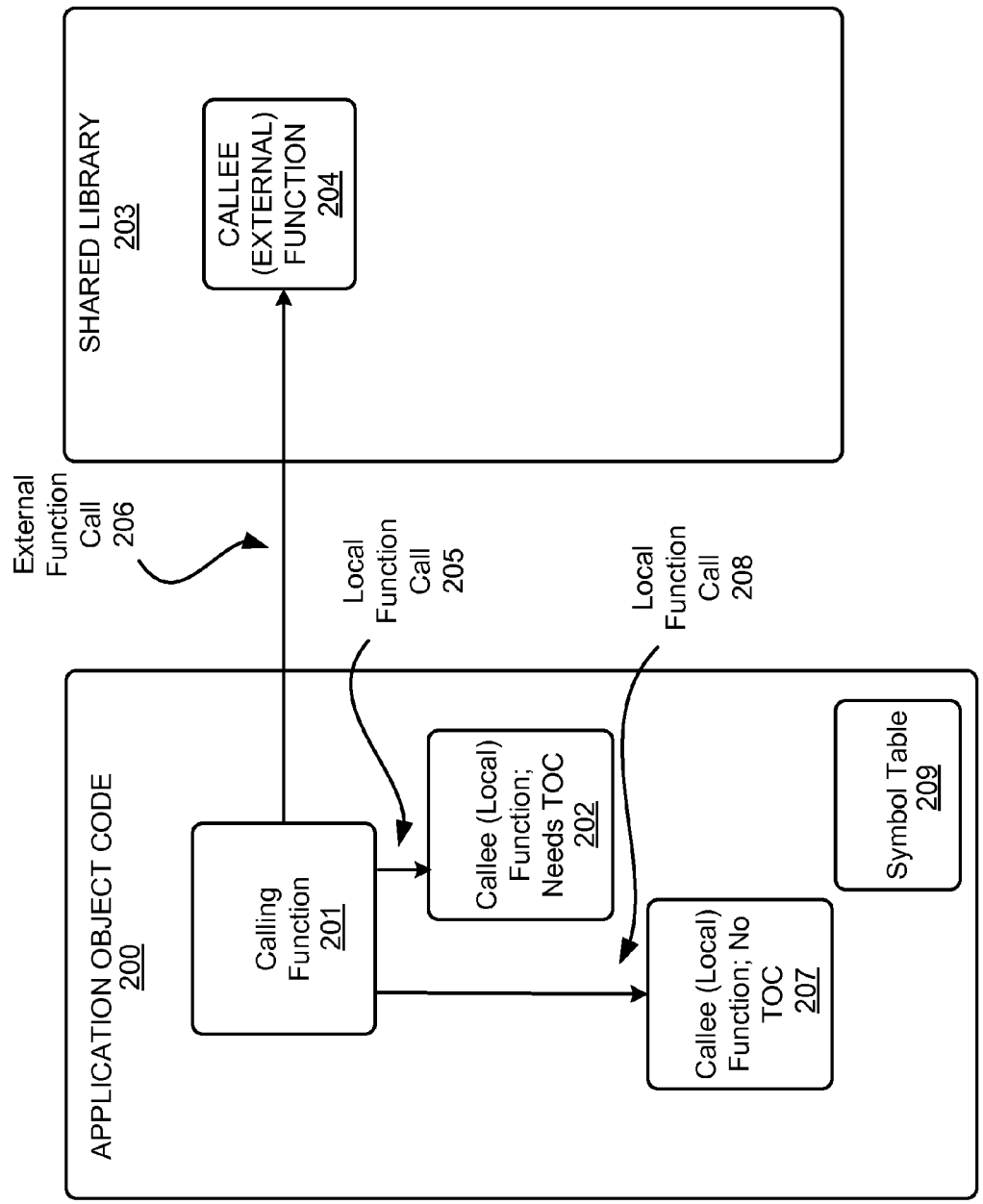
FIG. 2 depicts local and external function calls, according to various embodiments.

FIG. 2 illustrates embodiments of local function calls 205 and 208, and an external function call 206. FIG. 2 is discussed with reference to FIG. 1. Application object code 200 may include application object code 103 of FIG. 1, and shared library 203 may include shared libraries 104 of FIG. 1. Calling function 201, callee function 202, and callee function 207 are part of application object code 200, and callee function 204 is part of shared library 203. If the calling function 201 and the callee function 202 are both part of application object code 200 and the callee function 202 requires a TOC pointer, then the callee function 202 is local to the calling function 201. The call is a local function call 205, and the calling function 201 and the callee function 202 have the same TOC pointer value, so the TOC pointer value does not need to be saved and restored in conjunction with the local function call 205.

If the callee function 207 does not require a TOC pointer and instead uses the register normally serving as TOC register 108 as another type of register (such as a normal application defined register) during execution, as indicated by the TOC register usage indicator associated with the callee function 207 in symbol table 109/209, then the TOC pointer value does need to be saved and restored in conjunction with the local function call 208. Thus, in an embodiment, the linker may insert TOC save and restore commands in conjunction with any such function call, when the specific TOC register usage indicator specifies the TOC register as an application register in the symbol table for a local function.

If the calling function 201 is part of the application object code 200, and the callee function 204 is in the shared library 203, then the callee function 204 is external to the calling function 201 and the call is an external function call 206, and the calling function 201 and the callee function 204 have different TOC pointer values. Thus, the linker inserts TOC save and restore commands in conjunction with any external function call. In various embodiments, the linker may insert TOC save and restore commands with a possible external function call based on the information available at static link time, even if the call is determined not to be an external call during the load time. When calling function 201 performs an external function call 206 to callee function 204, or when calling function 201 performs a local function call 208 to callee function 207 that does not require a TOC pointer and may use the TOC register 108 for another purpose, then the value of the TOC pointer of the calling function 201 is saved from TOC register 108 to the stack frame 105.

When the callee function 204/207 exits and execution passes back to the calling function 201, the value of the TOC pointer of the calling function 201 is restored to the TOC register 108 from the stack frame for the calling function 201 in the stack 105. FIG. 2 is shown for illustrative purposes only; any number of functions may be included in application object code 200 and shared library 203, and these functions may call one another in any appropriate manner. Some embodiments of a local function, such as callee function 202, may require a TOC pointer, while other embodiments of a local function, such as callee function 207, may not require a TOC pointer value and the register may be used as an application defined register, in which the TOC pointer value of the calling function needs to be saved and restored after the callee function completes. In various embodiments an external function, such as callee function 204, may not require a TOC pointer value or requires a different TOC pointer value than the calling function 201. For either instance, the TOC pointer value of the calling function needs to be saved regardless of use, because the caller does not know how and if the TOC register is used or whether it may be preserved when it is not used as a TOC register in regards to external function calls.

Figure 3:
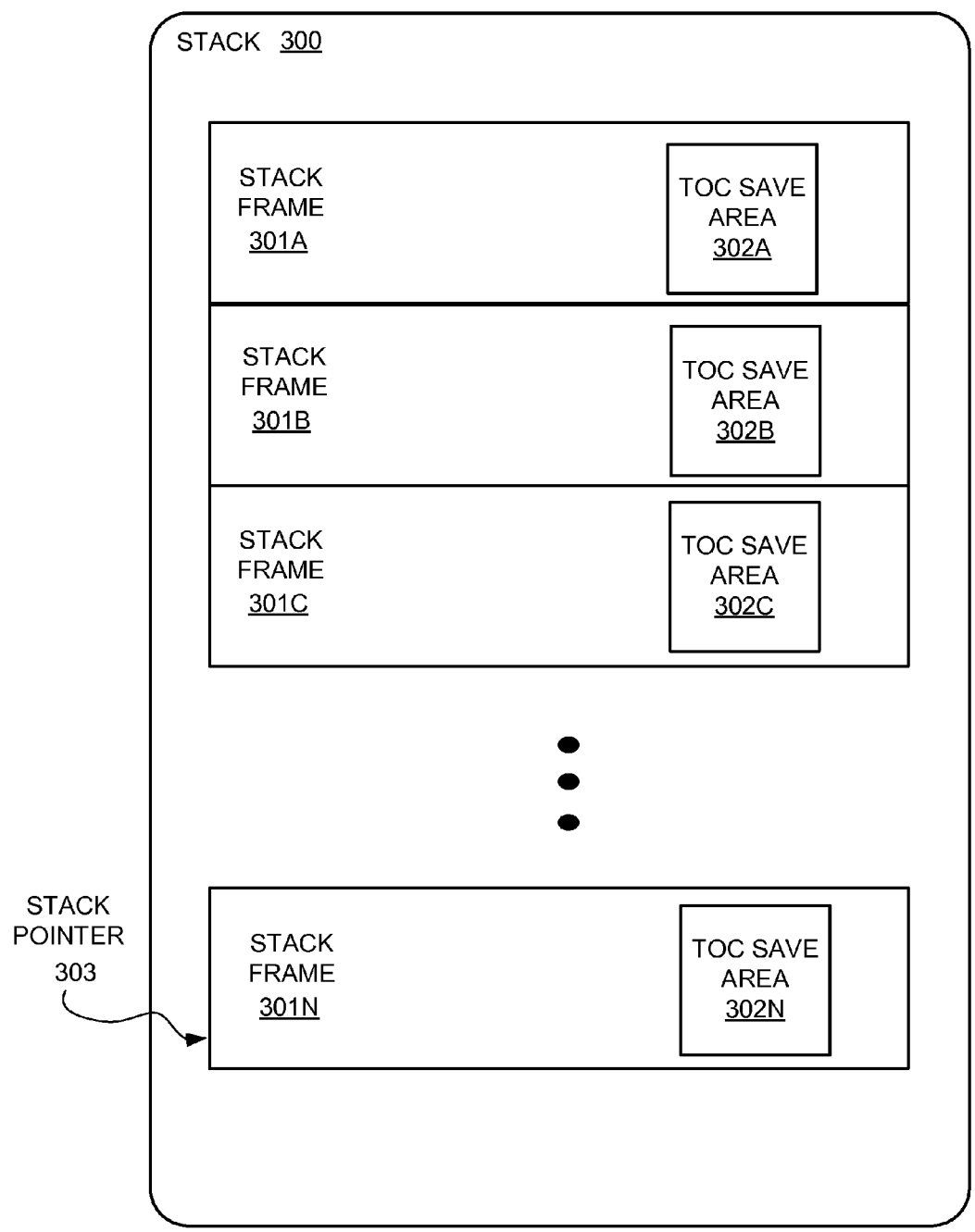
FIG. 3 depicts a stack for storage of a TOC pointer value, according to various embodiments.

FIG. 3 illustrates an embodiment of a runtime stack 300. Stack 300 may include stack 105 of FIG. 1. FIG. 3 is discussed with reference to FIGS. 1 and 2. Stack 300 includes a plurality of stack frames 301A-N corresponding to active functions that are currently being executed during execution of application object code 103 by processor 101. The stack 300 grows downwards from stack frame 301A, and a stack pointer 303 points to the most recently added stack frame 301N on the stack 300. Each stack frame of stack frames 301A-N stores information regarding its respective function, and includes a respective TOC save area 302A-N. When a calling function 201 calls a callee function 207 that has a TOC register usage indicator in symbol table 109/209 that specifies that the callee function 207 does not require a TOC pointer and the associated hardware register (for example, R2) is used for another purpose by the function, then the TOC pointer value of the calling function 201 is saved from the TOC register 108 to the TOC save area of the calling function's stack frame (for example, TOC save area 302N in stack frame 301N) in stack 300. The TOC pointer value is saved for restoration to the TOC register 108 after the callee function 207 completes and execution passes back to the calling function 201. In further embodiments, a TOC register save area 302A-N may also be used to store the value of the TOC register 108 for the function associated with the TOC register save area's stack frame for calling functions that call external callee functions, in which the callee function may load its own TOC pointer value within the TOC register 108

Figure 4:
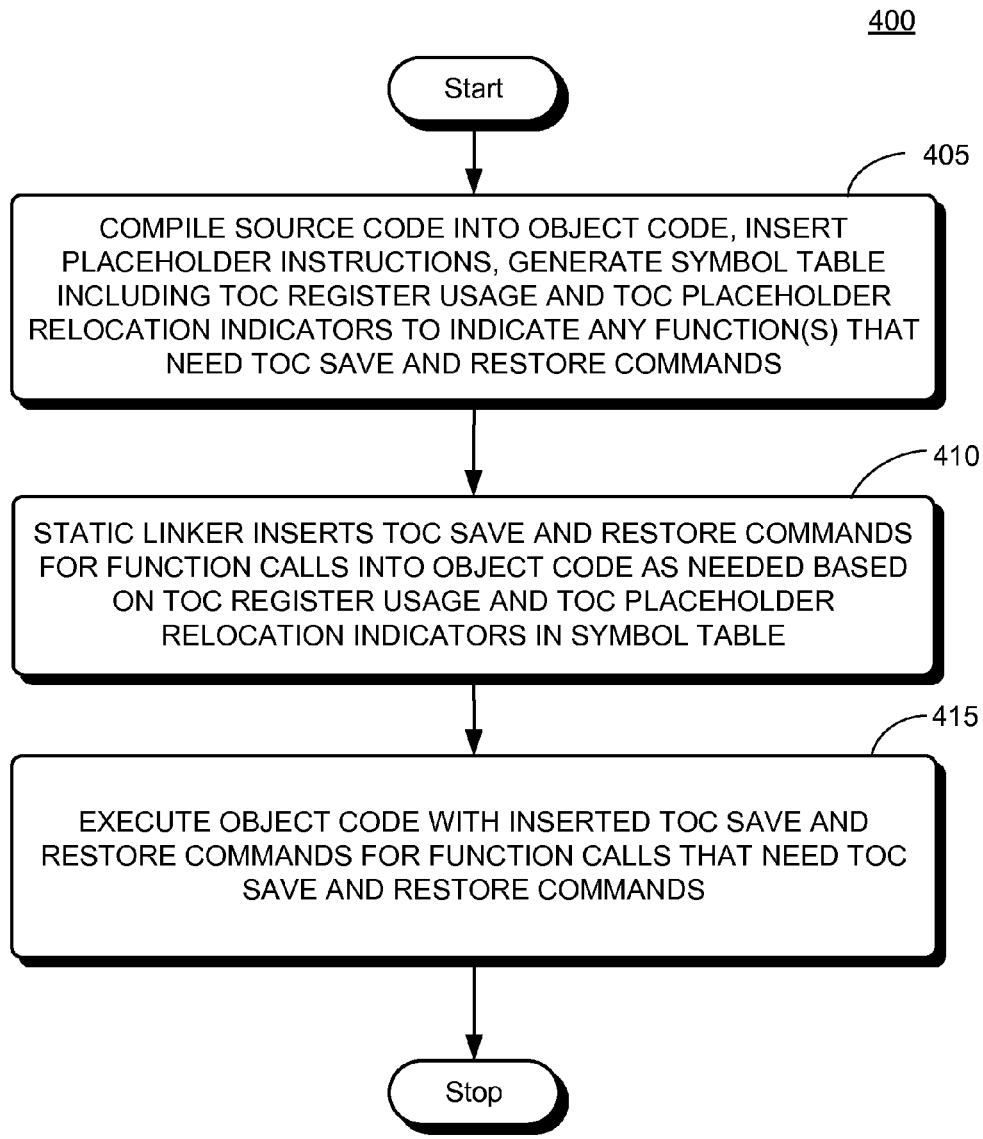
FIG. 4 depicts a process flow for compiling and executing application object code, according to various embodiments.

FIG. 4 illustrates an embodiment of a method 400 for compiling and executing object code where the compiler is configured to generate and suppress placeholders of save commands for a TOC pointer value and to suppress other save actions when a TOC save command already exists in the calling function for saving the same TOC pointer value. FIG. 4 is discussed with respect to FIGS. 1-3. First, in operation 405, before runtime, a compiler, such as compiler 107, generates application object code 103 from program source code (not shown). The compiler that generates application object code 103 may be located on another computer system that is distinct from computer system 100. The compiler 107 may insert TOC placeholder instructions, which may include no operation (NOP) instructions in some embodiments, or TOC save and restore commands in other embodiments, at TOC save and restore locations corresponding to all of the function calls in the application object code 103 during compiling. The placeholder instructions act as placeholders for TOC save and restore commands that may be inserted by static linker 106 after compilation and before runtime. In embodiments where the compiler inserts the TOC save and restore commands instead of the NOP instructions as placeholders, the static linker 106 may replace TOC save and restore commands inserted into the object code by the compiler with placeholder instruction (NOP instructions) when the TOC commands are not needed. In further embodiments, placeholder instructions corresponding to TOC save and restore points may be inserted manually by a programmer into program source code that comprises assembly code. In various embodiments, the relocation indicators are used to direct the linker to shared placeholders so as not to insert unnecessary TOC save commands.

Any appropriate number of placeholder instructions may be inserted at any appropriate location in conjunction with each function call in various embodiments. In some embodiments, two placeholder instructions may be inserted adjacent to each function call (both external and local) in the application object code 103. In various embodiments, for function pointer calls (i.e., indirect calls) it is not known whether or not the function call is to a local or external function, which may also vary during runtime. In various embodiments, in which the TOC register 108 is a caller-saved register, there may be a first placeholder instruction inserted before each function call in a calling function corresponding to a TOC save point, and a second placeholder instruction inserted after each function call in a calling function corresponding to a TOC restore point. In other embodiments in which the TOC register 108 is a callee-saved register, the placeholder instructions corresponding to TOC pointer value save and restore commands may be inserted at the beginning and the end of a callee function. In further embodiments, the compiler may insert a placeholder instruction after a function call, but not before the function call. In various embodiments, when there is an indirect function call, the function call requires an unconditional TOC pointer value save. The TOC pointer value save command may be inserted before compiling the source code or the compiler may recognize the indirect function call and insert a TOC pointer value save command before the function call. This guarantees that the calling function's TOC pointer value that is stored in the TOC register 108 is saved for an undeterminable function call type (i.e. local or external function calls) Table 1 illustrates an example of pseudocode corresponding to the application object code after operation 405, with placeholder instructions that comprise NOP instructions.

TABLE 1

Example pseudocode with inserted NOP instructions

| f( ) | //calling function |
|---|---|
| { | |
| NOP | //first NOP for call to d( ) |
| d( ) | //call to local function that needs TOC |
| NOP | //second NOP for call to d( ) |
| NOP | //first NOP for call to g( ) |
| g( ) | //call to local function that does not need TOC |
| NOP | //second NOP for call to g( ) |
| } | |

In some instances, the TOC placeholder instructions may be redundant or cause interlocks when TOC pointer value commands are present, causing processor resources to be unnecessarily used or slowed. For instance, if the function call is within a loop, the TOC save command inserted in a TOC placeholder instruction by the static linker may store the TOC pointer value as many times as the loop is performed to the same location even though the TOC pointer value may only need to be saved once. In other instances, there may be multiple function calls to possible different external callee functions where a TOC pointer value save from the TOC register is performed for each function call. The example of where a function call is performed many times by a loop is illustrated in pseudocode of Table 2.

TABLE 2

Example pseudocode with inserted TOC save command instructions in loop

| f( ) | //calling function |
|---|---|
| { | |
| NOP | //first NOP for call to d( ) |
| d( ) | //call to local function that needs TOC |
| NOP | //second NOP for call to d( ) |
| for (i = 0; i < 1000000; i++) { | //loop of g( ) TOC pointer stored a million //times to the same location |
| NOP | //save TOC for f( ) may be inserted by linker or compiler in first //NOP for call to g( ) |
| g( ) | //call to external function that has different TOC pointer |
| NOP | //restore TOC for f( ) may be inserted by linker or compiler in second NOP for call to g( ) |
| } | |
| } | |

In Table 2 above, the static linker 106 may insert a TOC save command in the first NOP for call to g( ). The TOC save command may store the TOC pointer value for f( ) a million times to the same location within the stack 105. In embodiments of the present disclosure, the compiler 107 may determine a prospective location to which current TOC placeholders for a TOC save command may be repositioned. In various embodiments, TOC placeholders for TOC restore commands may be repositioned as well, but for clarity the following will describe the method with regards to TOC save commands.

Figure 5:
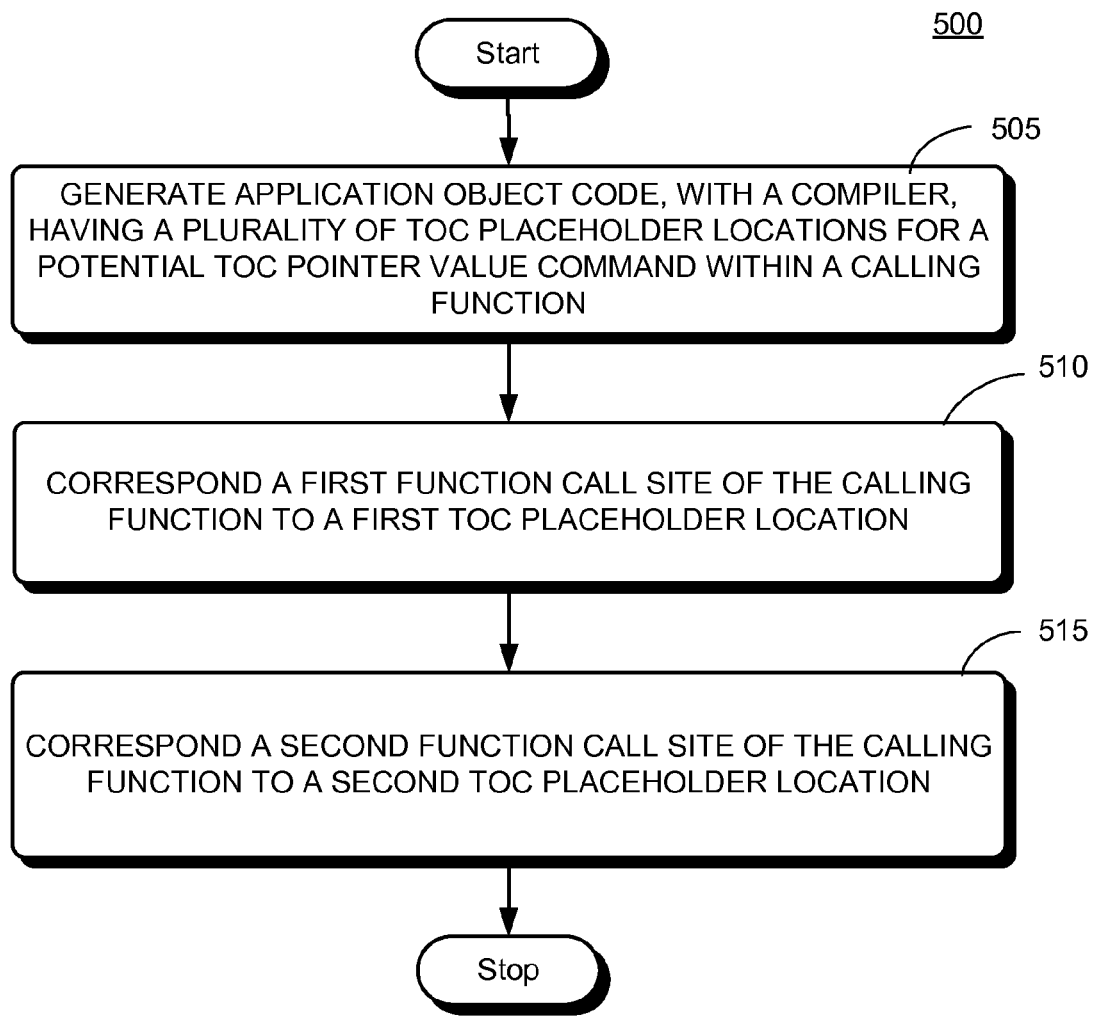
FIG. 5 depicts a method of positioning TOC placeholders for TOC save and restore commands, according to various embodiments.

FIG. 5 illustrates a flowchart of a method 500 of compiling application source code into application object code corresponding to operation 405 of FIG. 4. The remaining operations of FIG. 4 are described below. In operation 505, a compiler may generate application object code having a plurality of TOC placeholder locations in a calling function. In operation 510, the compiler may correspond a first function call site of the calling function to a first TOC placeholder location. In operation 515, the compiler may correspond a second function call site of the calling function to a second TOC placeholder location.

Figure 6:
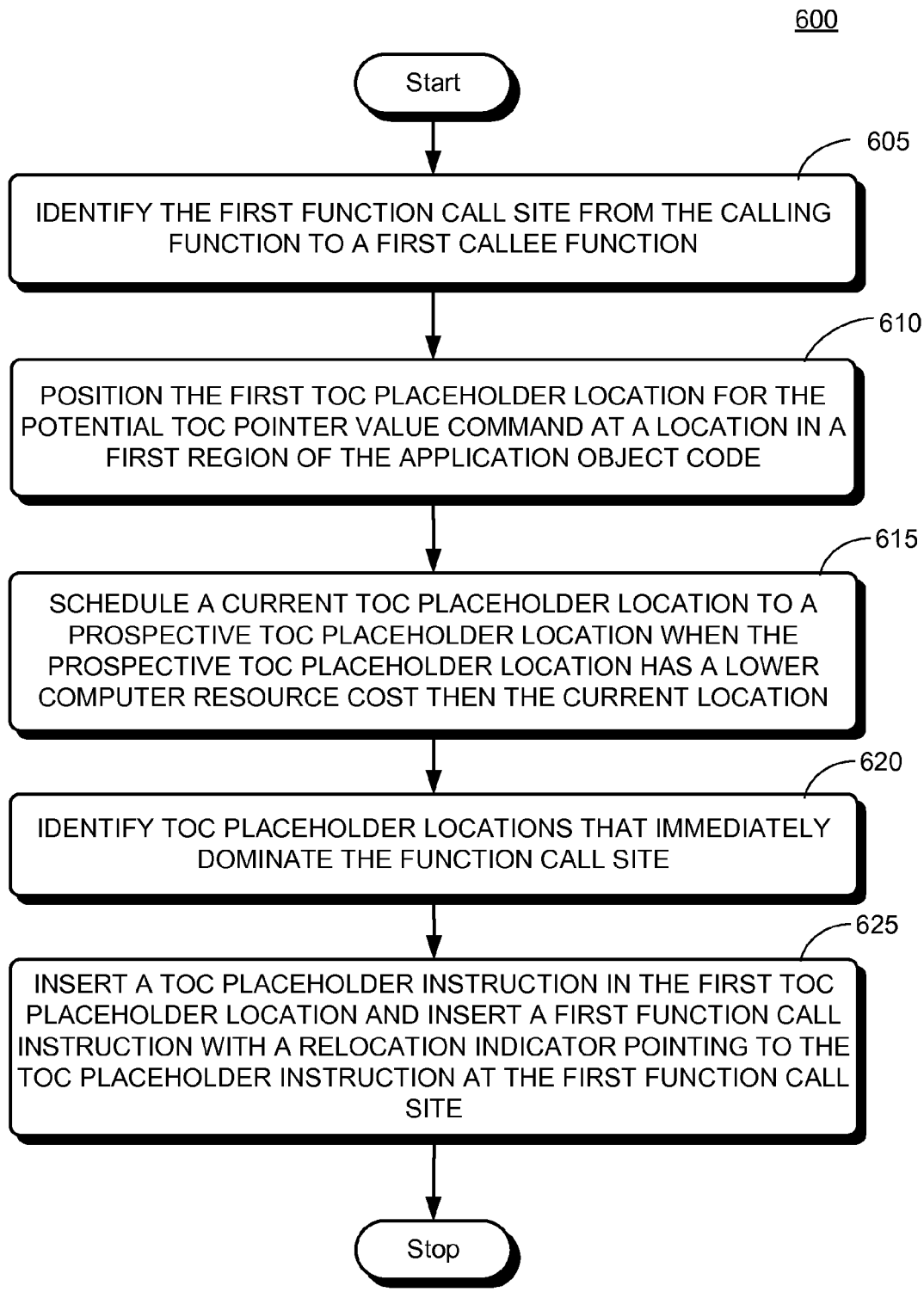
FIG. 6 depicts a method of positioning TOC placeholders for TOC save and restore commands, according to various embodiments.

FIG. 6 illustrates a flow chart of a method 600, according to various embodiments. Method 600 explains method 500 in greater detail. In operation 605, the compiler may identify all of the function call sites within a calling function that call one or more callee functions. Each call site, as discussed earlier, needs a TOC placeholder where TOC placeholder instructions may be inserted by the compiler where a TOC command, such as a TOC save command or TOC restore command, may later be inserted to save a TOC pointer value of the calling function that is stored in a TOC register. The compiler may not know whether or not a calling function needs a TOC save command associated with a function call because the compiler cannot determine whether a function call is to a local or external function.

In operation 610, the compiler may position current TOC placeholders for function calls within the application object code. The compiler may use a number of algorithms to determine a location of the TOC placeholder. In various embodiments, the compiler may use control flow analysis with "lazy code motion" (LCM) to determine the positions of TOC placeholders. LCM is an optimization technique that identifies an expression that is computed several times during the execution of a program, and moves the computation of such expression to different locations, in order to compute it less frequently overall. LCM takes into consideration places where the result of the expression (e.g. TOC save command) is needed ("uses"), e.g., function calls. LCM may also take into consideration where inputs needed to compute the expression are modified ("kills"), e.g., instructions that invalidate the TOC save command. Where there are kills the, expression needs to be recomputed if needed again afterwards.

With regards to the expression being the TOC save placeholder, in various embodiments, calls are considered "uses" and instructions that invalidate the saved TOC (e.g. dynamic stack allocation (alloca)) are considered "kills". Operation 610 may be performed by LCM starting with the "uses" and pushing the TOC save placeholders as far up the control-flow graph as possible, (until reaching the beginning or "kills"), to expose redundancies and merge redundant TOC save placeholders. After determining how high up the control flow graph the TOC save placeholder may go, the LCM may then push the TOC save placeholders as far down the control flow graph as possible. This is to avoid adding TOC saves to a path that otherwise would not have needed the TOC save command. For example, a TOC save placeholder for a third function call in the calling function may be pushed up before the first and second function calls if no "kills" between them. When pushed down the control flow graph, the TOC save placeholder for the third function call may not be pushed down past the first function call. Therefore, the first function call's TOC save placeholder may be merged with the third function call's TOC save placeholder. The code between the "highest" location and "lowest" location for the first TOC placeholder location may be referred to as the first range. In general, performing the LCM for each function call site may result in at most one TOC placeholder per basic block unless there are instructions present in the basic block that invalidate the saved TOC.

Once the current TOC save placeholder location is determined, the location associated with the TOC save placeholder may have a computer resource usage cost associated with it. This cost may be the use of computer resources used when executing object code when a potential TOC pointer value save command is inserted into the TOC save placeholder location.

Other techniques may be used by the compiler for positioning the TOC placeholders. For example, an optimization technique to remove code from a loop may be loop-invariant code motion. Combining multiple TOC placeholder sites may be done by commoning techniques such as common subexpression elimination.

In operation 615, the method 600 may schedule TOC save placeholders. The current TOC save placeholder locations may be positioned to a more optimal location at a prospective TOC save placeholder location. The compiler may compare the computer resource usage cost of the current TOC placeholder locations (if a potential TOC pointer value save command is inserted) to the computer resource usage cost of prospective TOC placeholder locations. If the computer resource usage cost of the prospective TOC placeholder location is less than that of the current TOC placeholder location, then the compiler may use the prospective TOC placeholder location as long as no calls or instructions that invalidate a TOC save are crossed. Operation 615 may be used to adjust the TOC save placeholders locations to reduce pipeline interlocks, for example.

In operation 620, the compiler may identify an immediately dominating TOC placeholder location for each function call site. The immediately dominating TOC placeholder location for a call site is the dominating TOC placeholder location that is closest to the call site. After an algorithm is used to position the TOC save placeholders, there is not a link between the calls in the calling function and the TOC placeholder location. For each function call site, the instructions dominating the function call site may be traversed. At least one of the instructions is guaranteed to be a TOC save placeholder by the algorithm that positioned the TOC save placeholder and the compiler selects the TOC save placeholder that is closest to the function call site. Operation 620 may be implemented by visiting each basic block only once using a depth-first walk of the dominator tree which ensures that each basic block is visited only after its immediate dominator block was visited.

An algorithm of the compiler may be executed within each block. The algorithm may include initializing the current TOC placeholder location to the one computed for the current block's immediate dominator block. A forward scan is performed through the basic block's instructions. When a TOC save placeholder is found, then the current placeholder location is set to the current instruction. When finding a call function call site, then the compiler sets the immediately dominating placeholder location to the current placeholder location. At the end of the basic block, the compiler may remember the current placeholder location as the current block's output, which may be used with future blocks dominated by the current block.

In operation 625, code is emitted by the compiler. At each TOC save placeholder location, that was determined by the method 600, a TOC placeholder instruction may be inserted. For example, the compiler may insert a NOP instruction for each TOC save and restore placeholder location. At each function call site, the compiler may emit the call instruction to the function call site as well as a relocation indicator pointing to the TOC save placeholder instruction identifying the location of the TOC save placeholder. The relocation indicator may be used by the linker to recognize where to insert a TOC save command at the positioned TOC placeholder and remove any TOC save commands in the PLT stub code created by the linker in situations where a linker creates a PLT stub code. In various embodiments, the relocation indicator may be any executable and linking format (ELF) relocation type.

In various embodiments, instead of the TOC save placeholder locations being populated with placeholder instructions of NOP instructions, the placeholders instructions may be TOC save commands and the linker may remove any unnecessary TOC save commands when it is determined the TOC save commands are associated with a function call that is a local call that needs a TOC pointer. In various embodiments, when there are no prospective TOC save placeholder locations for a current TOC save placeholder location or a prospective TOC save placeholder location is not more optimal with regards to increased processor performance, then the current TOC placeholder may remain and no association to another TOC placeholder location may be formed.

Figure 7:
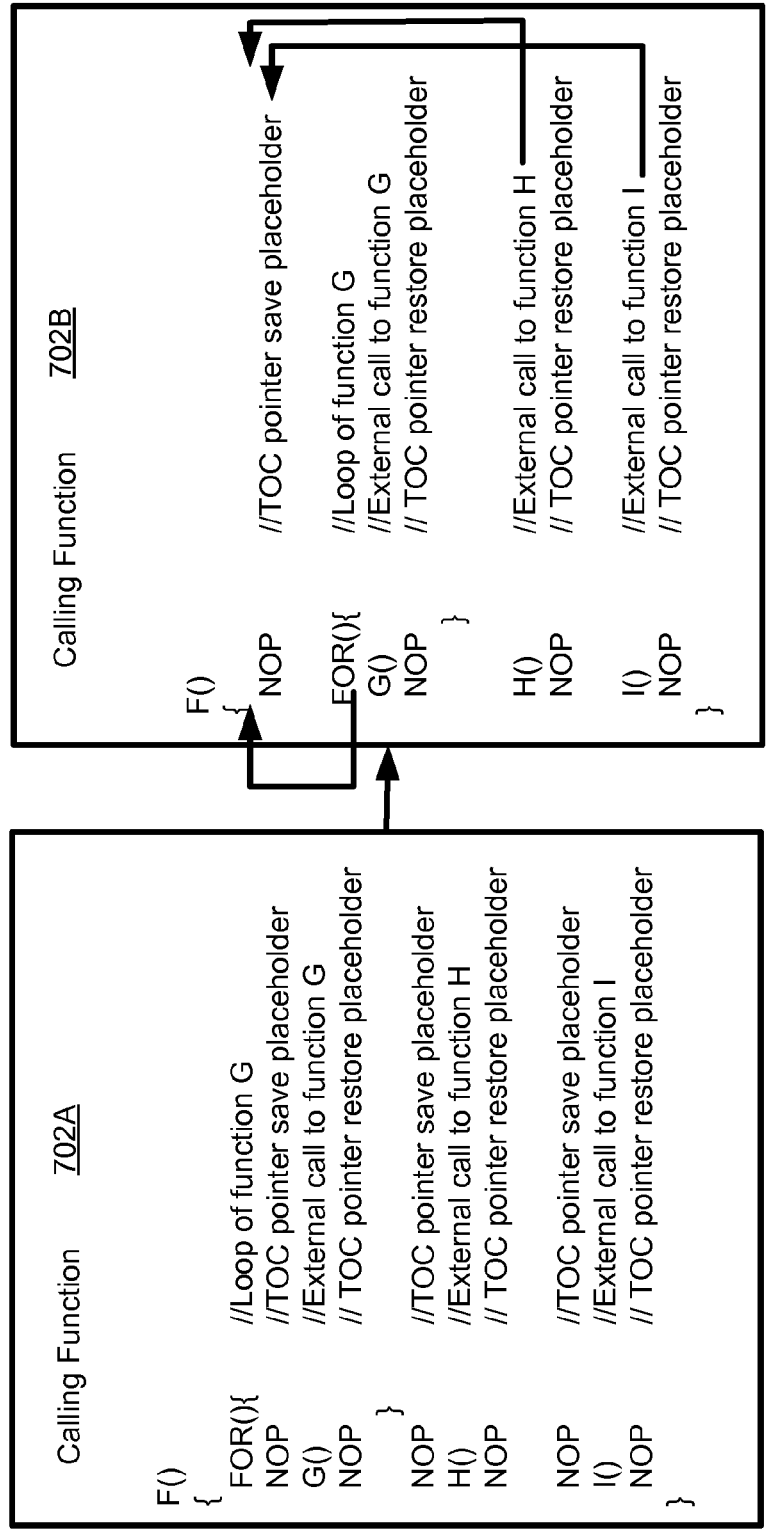
FIG. 7 depicts examples of application pseudo code where TOC placeholders are positioned, according to various embodiments.

FIG. 7 illustrates an example of code where the methods 500 and 600 may be implemented. FIG. 7 illustrates application object code 700 where the calling function 702A may be changed by the compiler to reduce the number of TOC pointer saves within the calling function as shown in calling function 702B. For example the TOC save placeholder may be removed from the loop with a loop-invariant code motion. The LCM described above may look at each function call and move up the TOC save placeholder for H( ) and I( ) as far as it can within the calling function and then down as far as possible without adding unnecessary TOC saves. Relocation indicators may point the function call sites G( ), H( ), and I( ) to the TOC save placeholder location. The compiler may insert the NOP placeholder instructions within the TOC save placeholder location as well as the relocation indicator with the function call instructions at the function call site.

Returning to FIG. 4, during operation 405, at the time of compiling, the compiler may also generate a symbol table 109 for the application object code 103. The symbol table 109 includes a list of functions and variables that are used in the application object code 103, and gives various characteristics such as type, scope level, and/or location for the listed functions and variables. The symbol table 109 may include TOC register usage indicators that may indicate any functions local or external that do not need a TOC pointer value to be stored in TOC register 108, but rather may use TOC register 108 as an application register. The symbol table 109 may include TOC register usage indicators that may indicate any external functions that need the TOC register for an alternative TOC pointer value than the calling function's TOC pointer value. A TOC register usage indicator for a function may comprise a "st_other" field associated with the function in the symbol table 109, and may be a 1-bit field in some embodiments. In further embodiments, the "st_other" field may be any appropriate length, such as a 3-bit field, which is discussed in further detail below. Table 3 illustrates an example of an excerpt of a symbol table 109 corresponding to the pseudocode of Table 1 that uses a single bit indicator in st_other for TOC register use.

TABLE 3

Excerpt of example symbol table corresponding to pseudocode of Table 1

| | |
|---|---|
| f( ) : st_other = 1 | //calling function, needs TOC pointer |
| d( ) : st_other = 1 | //callee function, needs TOC pointer |
| g( ) : st_other = 0 | //callee function, does not need TOC pointer |

Next, in operation 410, after compilation and before runtime of the application object code 103, static linker 106 may insert TOC save and restore commands, as needed, into the application object code 103 in the locations indicated as TOC save and restore locations, respectively. In one embodiment, TOC save and/or restore placeholder locations are indicated by the presence of one or more placeholder instructions associated with a function call, such as a bl instruction in accordance with the Power ISA. In another embodiment, a relocation indicator may be used to explicitly identify the location of a TOC save and/or restore placeholder location for a function call when a compiler has inserted a relocated TOC save and/or TOC restore placeholder location. TOC save and restore commands are inserted for external function calls 206, but are not inserted for local function calls 205 that use a shared TOC pointer value in TOC register 108 during execution, as, for such a local function call 205, the TOC pointer value is the same for the calling function 201 and callee function 202. For a local function call 208 to a callee function 207 that does not require a TOC pointer value register and instead uses the TOC register 108 as an application-defined register, as indicated by the TOC register usage indicator for the callee function 207 in symbol table 109/209, the static linker 106 inserts TOC save and restore commands around all calls to the callee function 207 in the application object code 103 at the relocated TOC placeholders.

When resolving a local function call 205 to a local function that uses a TOC, no TOC pointer value save and restore commands are inserted by the linker for a corresponding call site. In some embodiments, when resolving a call 208 to a local function that does not use a TOC pointer value register but rather uses the register normally used to store a TOC pointer value as an application defined register, the static linker 106 replaces a first placeholder instruction associated with the local function call 208 that does not need a TOC with an instruction that stores the TOC pointer value of the calling function 201 from the TOC register 108 to the TOC save area in the stack frame of the calling function 201 in stack 105 (for example, TOC save area 302N in stack frame 301N in FIG. 3), and replaces a second placeholder instruction associated with the local function call 208 that does not need a TOC register with an instruction that restores the saved TOC pointer value from the TOC save area in the stack frame of the calling function 201 in stack 105 to the TOC register 108. When a compiler has not inserted a placeholder instruction for a TOC save placeholder location, in one embodiment, the static linker 106 may issue an error. When a compiler did not insert a placeholder instruction for a TOC save placeholder location in operation 405, in another embodiment, the static linker 106 inserts a call to a trampoline that includes a TOC save before performing the local function call.

In some embodiments, when resolving a call to a runtime-resolved function representing a possibly module-external function, then the static linker 106 may replace a first placeholder instruction associated with the external function call 206 with an instruction that stores the TOC pointer value of the calling function 201 from the TOC register 108 to the TOC save area in the stack frame of the calling function 201 in stack 105 (for example, TOC save area 302N in stack frame 301N in FIG. 3). The static linker 106 may also replace a second placeholder instruction associated with the external function call 206 with an instruction that restores the saved TOC pointer value from the TOC save area in the stack frame of the calling function 201 in stack 105 to the TOC register 108. The compiler further updates the call instruction to the function to be resolved at runtime to a possibly module external function with a call instruction to a PLT stub that is generated by the static linker 106 to locate the possibly module external function at runtime and insert a call to the located function. When there is a relocation indicator of a TOC register save and/or placeholder present, the static linker may insert a TOC save command or TOC restore command depending on the whether the placeholder is for a TOC save or restore and remove the respective command from the PLT stub that the static linker 106 generates. If no relocation indicator is present, then the PLT stub may contain the TOC save command.

Table 4 illustrates an example of pseudocode corresponding to the pseudocode of Table 2 after completion of operation 410. In Table 4, no TOC save/restore is performed in conjunction with the local function call to d( ), however, a TOC save/restore is performed in conjunction with the external function call to g( ).

TABLE 4

Example pseudocode with replaced NOP instructions

```
f( )                    //calling function
{
    NOP                 //first NOP for call to d( )
    d( )                //call to local function that needs TOC
    NOP                 //second NOP for call to d( )
    std r2, 24(r1)      //save TOC pointer value register for f( )
    for (i = 0; i < 1000000; i++) {//loop of g( )
        g( )            //call to external function with different TOC pointer
        ld r2, 24(r1)   //restore TOC pointer value register for f( )
    }
}
```

In further embodiments, the static linker 106 may generate fixup code in operation 410 of FIG. 4 when the calling function cannot be readily modified to perform the necessary TOC save and restore. Table 5 shows an example of an external function call including a PLT stub code performing a TOC pointer value register save because a TOC pointer value save cannot be directly inserted in the calling function.

TABLE 5

Example pseudocode with PLT Stub code

```
f( )                    //calling function
{
    NOP                 //first NOP for call to d( )
    d( )                //call to local function that needs TOC
    NOP                 //second NOP for call to d( )
    for (i = 0; i < 1000000; i++) {//loop of g( )
        jump to trampoline_for_g //branch to a trampoline for an
                                 //external function
        back_to_f:
    }
}
trampoline_for_g:
    save TOC pointer value register for f( ) in TOC save slot of f( ) stack
    frame
    g( )
    restore TOC for f( )
    jump to back_to_f
```

In other various embodiments, the static linker inserts fixup code for performing TOC pointer register save and restore for a call to a local function that uses a TOC pointer register as an application-defined register and indicates that the TOC pointer should be saved by the caller, when no TOC pointer register save and restore placeholders are present.

TABLE 6

Example pseudocode with fixup code performed in a trampoline

```
f( )                    //calling function
{
    NOP                 //first NOP for call to d( )
    d( )                //call to local function that needs TOC
    NOP                 //second NOP for call to d( )
    for (i = 0; i < 1000000; i++) {//loop of g( )
        goto trampoline_for_g;   //trampoline corresponding to a local
                                 //function requiring TOC pointer register
                                 //save and restore
        return_here_from_g_trmpoline:
    }
}
trampoline_for_g:
    save TOC pointer register    // for f( ) in f( ) function's stack frame
    g( )                         // g is a local function modifying TOC
                                 register
    restore TOC pointer register // for f( ) from f( ) function's stack frame
    goto return_here_from_g_trmpoline
```

Lastly, in operation 415, the application object code 103 is executed by processor 101. The executed code includes inserted TOC pointer value save and restore commands for functions call that require save and restore commands. The TOC pointer value save and restore commands may be positioned so that the computer system performance increases. Technical effects and benefits include decreasing the number of redundant TOC pointer value saves to reduce execution time and decreasing computer resources needed in performing the additional TOC pointer value saves.

Figure 8:
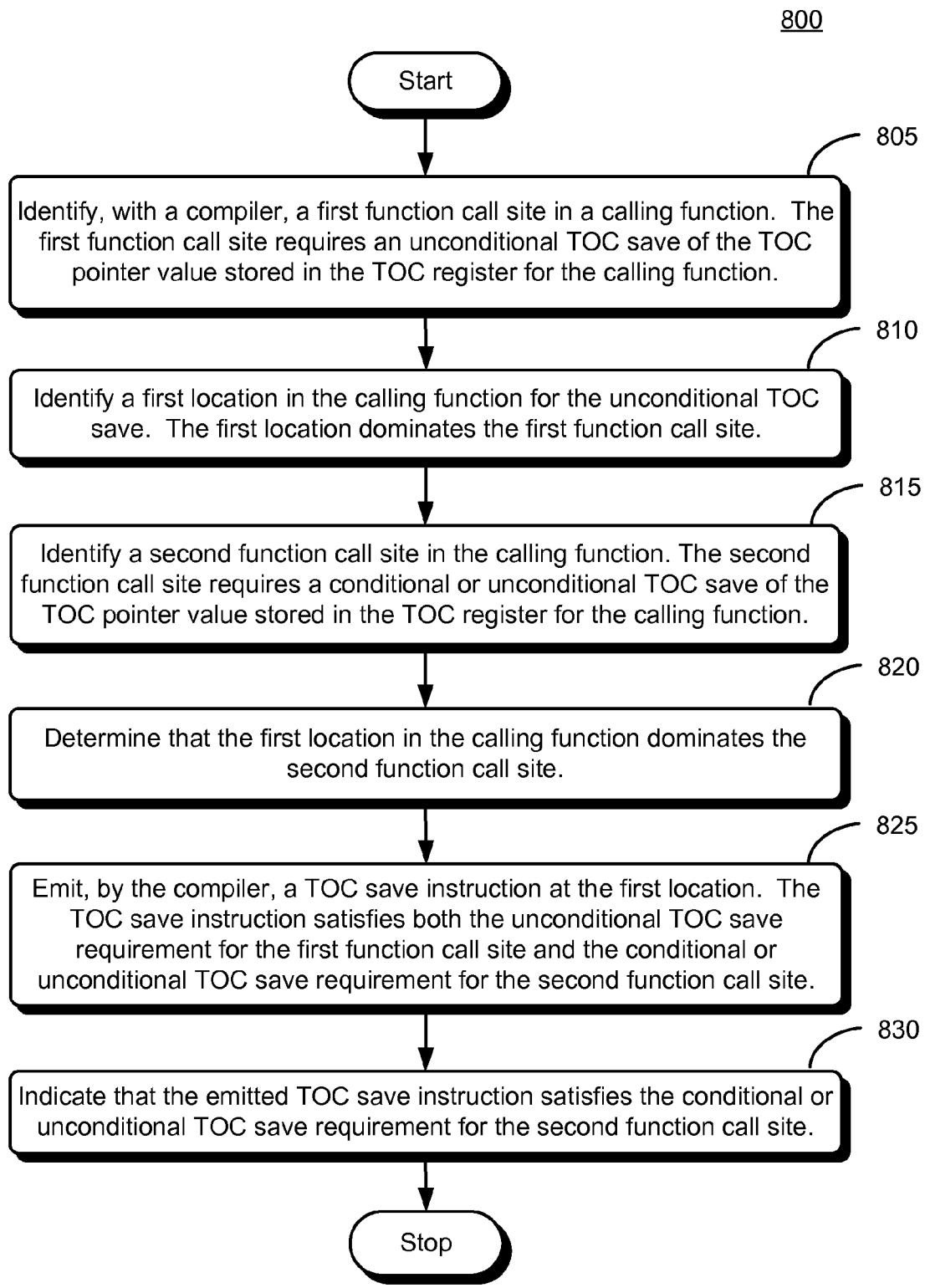
FIG. 8 depicts a flowchart of a method of suppressing placeholders of a save command for a TOC pointer value and of suppressing other TOC save actions in response to determining a first location of a TOC pointer value save command, according to various embodiments.

FIG. 8 illustrates a flowchart of a method 800 of suppressing TOC save actions, including suppressing placeholder commands for TOC save commands of TOC pointer values in a TOC register, when a known unconditional TOC save command exists in a calling function according to various embodiments. The method 800 may correspond with operation 405 of FIG. 4 and may be performed in conjunction with method 500 of FIG. 5. In operation 805, the compiler may identify a first function call site in a calling function requiring an unconditional TOC save of a TOC pointer value stored in a TOC register for the calling function. The first function call site may require an unconditional TOC save, for example, because the site contains an indirect function call or because of some other reason. The compiler may then at 810 identify a first location in the calling function for the unconditional TOC save to be performed. The first location must dominate the first function call site, and may dominate other function call sites as well. Furthermore, it must be determined if there are invalidating operations on any execution path between the first location and the first function call site. An invalidating operation invalidates the validity of a previous TOC save. An example of an invalidating operation is the presence of a function using facilities such as alloca or variable sized automatic arrays allocated on the stack. Such functions result in unstable stack pointers, and a change in stack pointers invalidates the validity of a previous TOC save. If there is an invalidating operation on an execution path between the first location and the first function call site, then a fixup step may be performed to ensure that the correct TOC pointer value is saved. When determining to place an unconditional TOC save, whether for an indirect function call or for any other reason, the compiler will emit a TOC save instruction rather than emitting relocations for the linker.

At operation 815, the compiler may identify a second function call site in the calling function. The second function call site may also require a TOC save of the TOC pointer value stored in the TOC register for the calling function. This TOC save requirement for the second function call site may be another unconditional TOC save requirement, or it may be a conditional TOC save requirement. A conditional TOC save requirement arises when the compiler is unable to determine whether the target function of the second function call site is local or not local to the calling function. A local target function will not require a TOC save, while a nonlocal target function will require a TOC save. Such a conditional TOC save is then evaluated during linking, and a TOC save is inserted if needed.

At operation 820, the compiler may determine that the first location also dominates the second function call site, that there are no invalidating operations on any execution path between the first location and the second function call site, and therefore a TOC save at the first location satisfies any TOC requirement for the second function call site. Because the TOC save at the first location is unconditional, any further TOC save actions related to the second function call site may be suppressed.

At operation 825, the compiler emits a TOC save instruction at the first location. This emitted TOC save instruction satisfies the unconditional TOC save requirement for the first function call site, and also satisfies the conditional or unconditional TOC save requirement for the second function call site. At operation 830, the compiler indicates that the emitted TOC save instruction satisfies the conditional or unconditional TOC save requirement for the second function call site and thus suppresses further TOC save actions. In some embodiments, suppressing further TOC save actions may be accomplished by indicating to the linker that the second function call site does not require a TOC save. In some embodiments, suppressing further TOC save actions may be accomplished by indicating to the linker that the TOC save in the first location satisfies the TOC save requirement for the second function call site. In embodiments where the compiler is performing a TOC save placeholder insertion algorithm for the second function call site, suppressing further TOC save actions may be accomplished by indicating to a linker that the second function call site does not require a TOC save placeholder, and the compiler may end the placeholder insertion algorithm for the second function call site.

In some embodiments, the unconditional TOC save may be at a first placeholder location. The first function call of the calling function may be an indirect call, which requires saving the TOC pointer value in the TOC register. Because the TOC pointer value save is unconditional, a TOC save command will exist after compilation. Therefore, any function calls following the first indirect function call site, whether they be indirect or direct function calls, may have their respective unconditional TOC saves or TOC placeholder locations combined with the first unconditional save when they are saving the same TOC pointer value and no instructions invalidating the TOC pointer value save lies between the function calls.

Therefore, the compiler may identify a second function call site in the calling function after the first function call. The second function call site may have a second placeholder location for a potential TOC placeholder instruction for a TOC save command. This may be for a direct call. In various embodiments, the second function call site may be for an indirect call having its own unconditional save in the second TOC placeholder location. The compiler may insert a TOC save command when recognizing there is an unconditional save rather than a TOC placeholder instruction such as a NOP instruction. The second TOC save command or the second TOC placeholder location saves the same TOC pointer value as the first unconditional save.

In some embodiments, the compiler may determine that the unconditional TOC save of the first function dominates the second placeholder location. This may be done similarly to operation 520 of method 500 above. For immediately dominating TOC placeholder locations for an indirect call the compiler marks the location as an unconditional TOC save.

In some embodiments, the compiler indicates that the second function call shares the unconditional save of the first function call when the unconditional TOC save dominates the second placeholder location. In various embodiments, this may be performed the same as operation 525 of method 500 of FIG. 5. In various embodiments, the compiler may emit a TOC placeholder relocation indicator when emitting the function call at the second call site for direct calls. In various embodiments, the compiler may not insert a special relocation indicator at indirect call sites that share the TOC pointer value save command of the first call site. In various embodiments, the compiler may directly emit a TOC save command into the first TOC placeholder location for the indirect call.

In various embodiments the first function call site may be for a direct function call while the second function call site may be for an indirect function call. In various embodiments, the first TOC placeholder location may be positioned according to the how the compiler positions the current TOC placeholder location of operation 510 of FIG. 5. Likewise, the second TOC placeholder location of the indirect function call may positioned to the same location as the first TOC placeholder location. The compiler, when determining the first TOC placeholder location immediately dominates the second function call site, may mark the first call site as an unconditional save. When emitting code, a TOC save command may be emitted by the compiler to the first TOC placeholder instruction.

In various embodiments the first TOC placeholder location may be scheduled to a more optimal location. These various embodiments may be performed the same way as operation 515 above for FIG. 5.

In various embodiments, a determination step may be introduced to identify unstable stack pointers, e.g., due to functions using facilities such as alloca functions or variable sized automatic arrays allocated on the stack. Any function calls reachable via a path containing such an operation are not considered to be dominated by a TOC save command, because a change in a stack pointer may invalidate the validity of a pervious store. In various embodiments, a fixup step may be performed and a copy of the prior saved TOC pointer value maybe copied to a new stack location.

Figure 9:
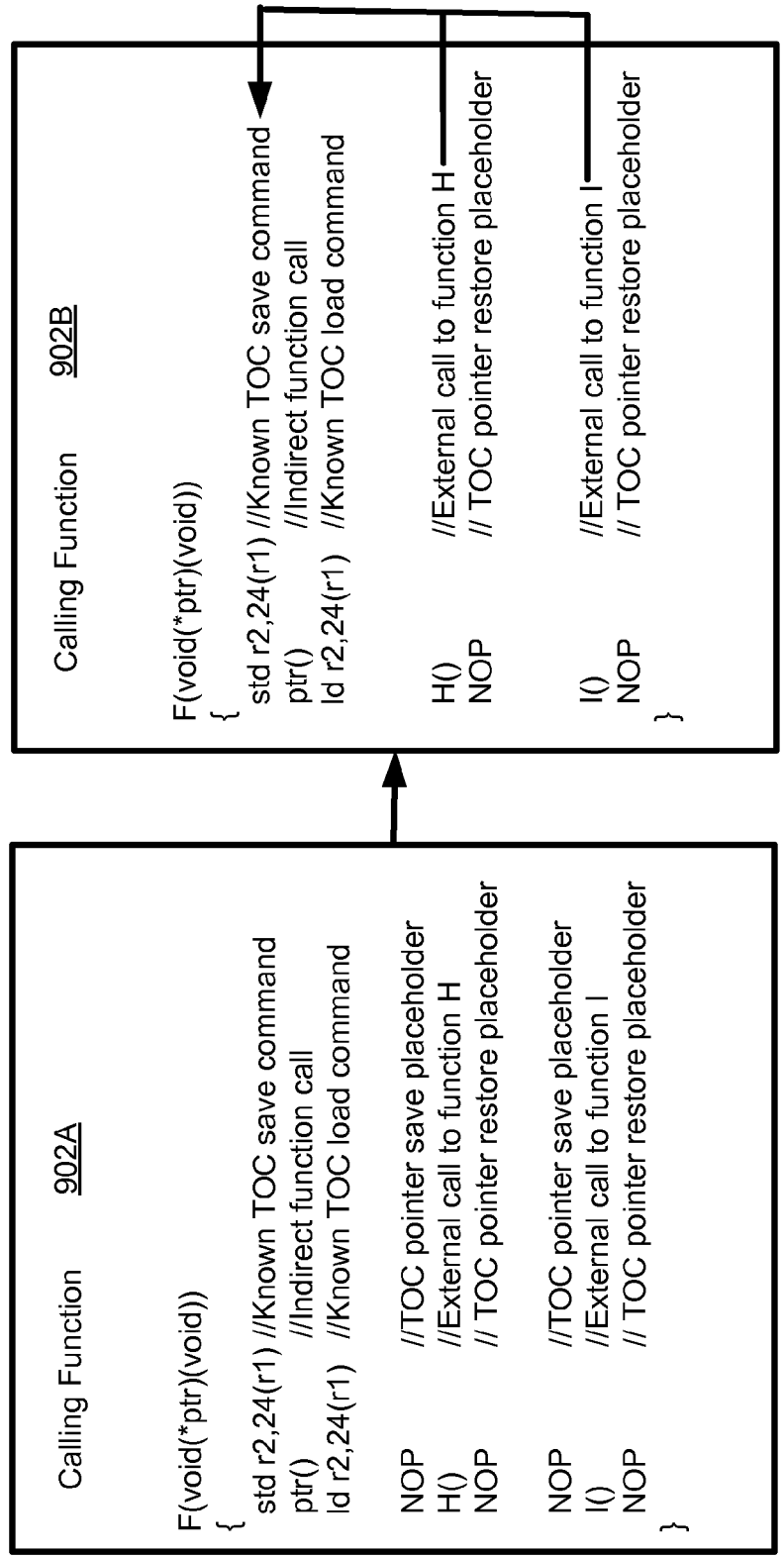
FIG. 9 depicts examples of application pseudo code where TOC placeholders are relocated due to an unconditional TOC save command for the TOC pointer value already existing, according to various embodiments.

FIG. 9 illustrates application object code 900 where the calling function 902A may be changed by the compiler to suppress the number of TOC placeholder locations for potential TOC pointer value commands when a TOC pointer value save command exists at compile time within the calling function as shown in calling function 902B. For both H( ) and I( ), the TOC save placeholder location may have relocation indicators that specify to the linker that the unconditional save command has already saved the TOC pointer value register for the calling function.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to enable others of ordinary skill in the art to understand the invention for various embodiments with various modifications as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for processing table of contents (TOC) saves, the computer program product comprising:
a computer readable storage medium having program instructions embodied therewith, the program instructions readable by a processing circuit to cause the processing circuit to perform a method comprising:
identifying, with a compiler, a first function call site in a calling function, the first function call site requiring an unconditional TOC save of a TOC pointer value stored in a TOC register for the calling function;
identifying a first location in the calling function for the unconditional TOC save, the first location dominating the first function call site;
identifying a second function call site in the calling function, the second function call site requiring a conditional or unconditional TOC save of the TOC pointer value stored in the TOC register for the calling function;
determining that the first location in the calling function dominates the second function call site;
emitting, by the compiler, a TOC save instruction at the first location in the calling function, the TOC save instruction satisfying the unconditional TOC save requirement for the first function call site and further satisfying the conditional or unconditional TOC save requirement for the second function call site; and
indicating that the emitted TOC save instruction satisfies the conditional or unconditional TOC save requirement for the second function call site.

2. The computer program product of claim 1, wherein the indicating that the emitted TOC save instruction satisfies the conditional or unconditional TOC save requirement for the second function call site comprises
indicating that the second function call site does not require a TOC save of the TOC pointer value.

3. The computer program product of claim 1, wherein the indicating that the emitted TOC save instruction satisfies the conditional or unconditional TOC save requirement for the second function call site comprises
indicating that the second function call site does not require a TOC save placeholder.

4. The computer program product of claim 3, wherein the compiler is performing a TOC save placeholder insertion algorithm for the second function call site, and wherein the indicating that the emitted TOC save instruction satisfies the conditional or unconditional TOC save requirement for the second function call site further comprises
ending the TOC save placeholder insertion algorithm for the second function call site.

5. The computer program product of claim 1, wherein the indicating that the emitted TOC save instruction satisfies the conditional or unconditional TOC save requirement for the second function call site comprises
inserting a function call instruction with a relocation indicator at the second function call site, the relocation indicator pointing to the emitted TOC save instruction at the first location.

6. A computer system for processing table of contents (TOC) saves, the computer system comprising:
a memory having computer readable instructions; and
a processor configured to execute the computer readable instructions, the instructions comprising:
identifying, with a compiler, a first function call site in a calling function, the first function call site requiring an unconditional TOC save of a TOC pointer value stored in a TOC register for the calling function;
identifying a first location in the calling function for the unconditional TOC save, the first location dominating the first function call site;
identifying a second function call site in the calling function, the second function call site requiring a conditional or unconditional TOC save of the TOC pointer value stored in the TOC register for the calling function;
determining that the first location in the calling function dominates the second function call site;
emitting, by the compiler, a TOC save instruction at the first location in the calling function, the TOC save instruction satisfying the unconditional TOC save requirement for the first function call site and further satisfying the conditional or unconditional TOC save requirement for the second function call site; and
indicating that the emitted TOC save instruction satisfies the conditional or unconditional TOC save requirement for the second function call site.

7. The computer system of claim 6, wherein the indicating that the emitted TOC save instruction satisfies the conditional or unconditional TOC save requirement for the second function call site comprises
indicating that the second function call site does not require a TOC save of the TOC pointer value.

8. The computer system of claim 6, wherein the indicating that the emitted TOC save instruction satisfies the conditional or unconditional TOC save requirement for the second function call site comprises
indicating that the second function call site does not require a TOC save placeholder.

9. The computer system of claim 8, wherein the compiler is performing a TOC save placeholder insertion algorithm for the second function call site, and wherein the indicating that the emitted TOC save instruction satisfies the conditional or unconditional TOC save requirement for the second function call site further comprises
ending the TOC save placeholder insertion algorithm for the second function call site.

10. The computer system of claim 6, wherein the indicating that the emitted TOC save instruction satisfies the conditional or unconditional TOC save requirement for the second function call site comprises
inserting a function call instruction with a relocation indicator at the second function call site, the relocation indicator pointing to the emitted TOC save instruction at the first location.

11. The computer system of claim 6, further comprising:
determining that an invalidating operation is not present on any execution path between the first location and the second function call site, the invalidating operation invalidating the unconditional TOC save.

* * * * *